United States Patent [19]
Liang

[11] Patent Number: 5,931,261
[45] Date of Patent: Aug. 3, 1999

[54] OIL SUPPLY AND RETURN TUBE SYSTEM FOR OIL TANKS IN CARS

[76] Inventor: Chung-Ho Liang, 2/F., No. 66, Sec. 2, Cheng-Tai Rd., Wu-Ku Village, Taipei County, Taiwan

[21] Appl. No.: 08/944,100

[22] Filed: Sep. 30, 1997

[51] Int. Cl.⁶ ............................................ F01M 5/00
[52] U.S. Cl. .......................... 184/104.3; 184/6.21
[58] Field of Search ................. 184/104.3, 6.21, 184/11.2, 6.28, 6.12, 6.2; 123/196 AB; 210/86, 172, 416.5, 168

[56] References Cited

U.S. PATENT DOCUMENTS

| | | | |
|---|---|---|---|
| 2,442,032 | 8/1948 | Booth | 73/55 |
| 4,452,695 | 6/1984 | Schmidt | 210/168 |
| 4,672,932 | 6/1987 | Schmidt | 123/196 A |
| 5,750,021 | 5/1998 | Liang | 210/86 |

*Primary Examiner*—John A. Jeffery
*Assistant Examiner*—Katrina B. Harris
*Attorney, Agent, or Firm*—Rosenberg, Klein & Bilker

[57] ABSTRACT

An oil supply and return tube system connected to an oil tank of a motor vehicle is provided. The system includes a base having an internally threaded oil intake hole and an internally threaded oil return hole, an oil intake pipe connected to the oil intake hole, an oil return pipe connected to the oil return hole, an air passage hole, an air discharge valve, and two lock devices respectively fastened to the oil intake hole and the oil return hole to lock the oil intake pipe and the oil return pipe in the oil intake hole and the oil return hole, respectively. The base has an open chamber at a top side thereof, two vertical coupling flanges bilaterally disposed at a side entrance of the open chamber, a cover plate covered on a top side of the open chamber, and a socket assembly mounted in the open chamber at one side and adapted for receiving an electric plug member.

2 Claims, 7 Drawing Sheets

OIL SUPPLY AND RETURN TUBE SYSTEM FOR OIL TANKS IN CARS

BACKGROUND OF THE INVENTION

The present invention relates to an oil supply and return tube system for oil tanks in cars, and more particularly to such an oil supply and return tube system which is suitable for use in any of a variety of cars.

FIG. 9 shows an oil supply and return tube system for oil tanks in cars according to U.S. Ser. No. 08/753,480. This system comprises a base 1 having two oil holes 14 (one for oil intake and one for oil return), two connectors 5 respectively fastened to the oil holes 14 by a screw joint, two rubber seal rings 51 respectively mounted around the connectors 5 to seal the gap. The oil pipe 6 which is to be connected to one oil hole 14 has a connector 61 at one end adapted for fastening to the connector 5 of the corresponding oil hole 14 by a screw joint. The drawback of this arrangement is that the oil seal rings 51 wear quick with use, thereby causing an oil leakage to occur. This oil supply and return tube system further comprises an air discharge valve 7 fastened to an air passage hole of the base 1 for adjustment of air pressure in the oil tank of the car. This structure of air discharge valve 7 comprises an air inlet hole 72 and an air outlet hole 73 connected in parallel to the air passage hole of the base 1, a cap 71 covered on the holes 72;73, a first spring 721 mounted inside the air inlet hole 72, a first stopper 722 supported on the first spring 721 and forced by it to close the passage of the air inlet hole 72, a second spring 731 mounted inside the air outlet hole 73, a second stopper 732 supported on the second spring 731 and forced by it to close the passage of the air outlet hole 73. The stoppers 722;732 are mounted with a respective copper plate 74. The size of the copper plates 74 for the stoppers 722;732 must be precisely controlled within a strict tolerance. If the copper plates 74 are made too large, they tend to damage the air discharge valve 7 when moved. If the copper plates 74 are made too small, they will be unable to stop the passage of the respective air holes.

SUMMARY OF THE INVENTION

According to one aspect of the present invention, the oil supply and return tube system is connected to an oil tank of a motor vehicle, comprising a base having an internally threaded oil intake hole and an internally threaded oil return hole, an oil intake pipe connected to the oil intake hole, an oil return pipe connected to the oil return hole, an air passage hole, an air discharge valve, and two lock devices respectively fastened to the oil intake hole and the oil return hole to lock the oil intake pipe and the oil return pipe, wherein the base comprises an open chamber at a top side thereof, two vertical coupling flanges bilaterally disposed at a side entrance of the open chamber, a cover plate covered on a top side of the open chamber, and a socket assembly mounted in the open chamber at one side and adapted for receiving an electric plug member, the socket assembly including a flat mounting plate having two coupling grooves respectively forced into engagement with the vertical coupling flanges of the base, and an electric socket raised from the flat mounting plate at an outer side and projecting out of the side entrance of the open chamber. According to another aspect of the present invention, the lock devices comprise a respective set of ring cushions and gaskets respectively mounted within the oil intake hole and the oil return hole, a respective clamping ring respectively mounted within the oil intake hole and the oil return hole and retained between two of the respective set of ring cushions and having oblique clamping pawls, and a respective lock screw tube respectively threaded into the oil intake hole and the oil return hole to force clamping pawls of the respective clamping ring into engagement with the periphery of the oil intake pipe or oil return pipe. According to still another aspect of the present invention, the copper plates of the stoppers in the air inlet and outlet holes of the air discharge valve have a respective annular groove around the periphery and a respective gasket mounted on the respective annular groove.

DETAILED DESCRIPTION OF THE PREFERRED EMBODIMENT

Figure 1:
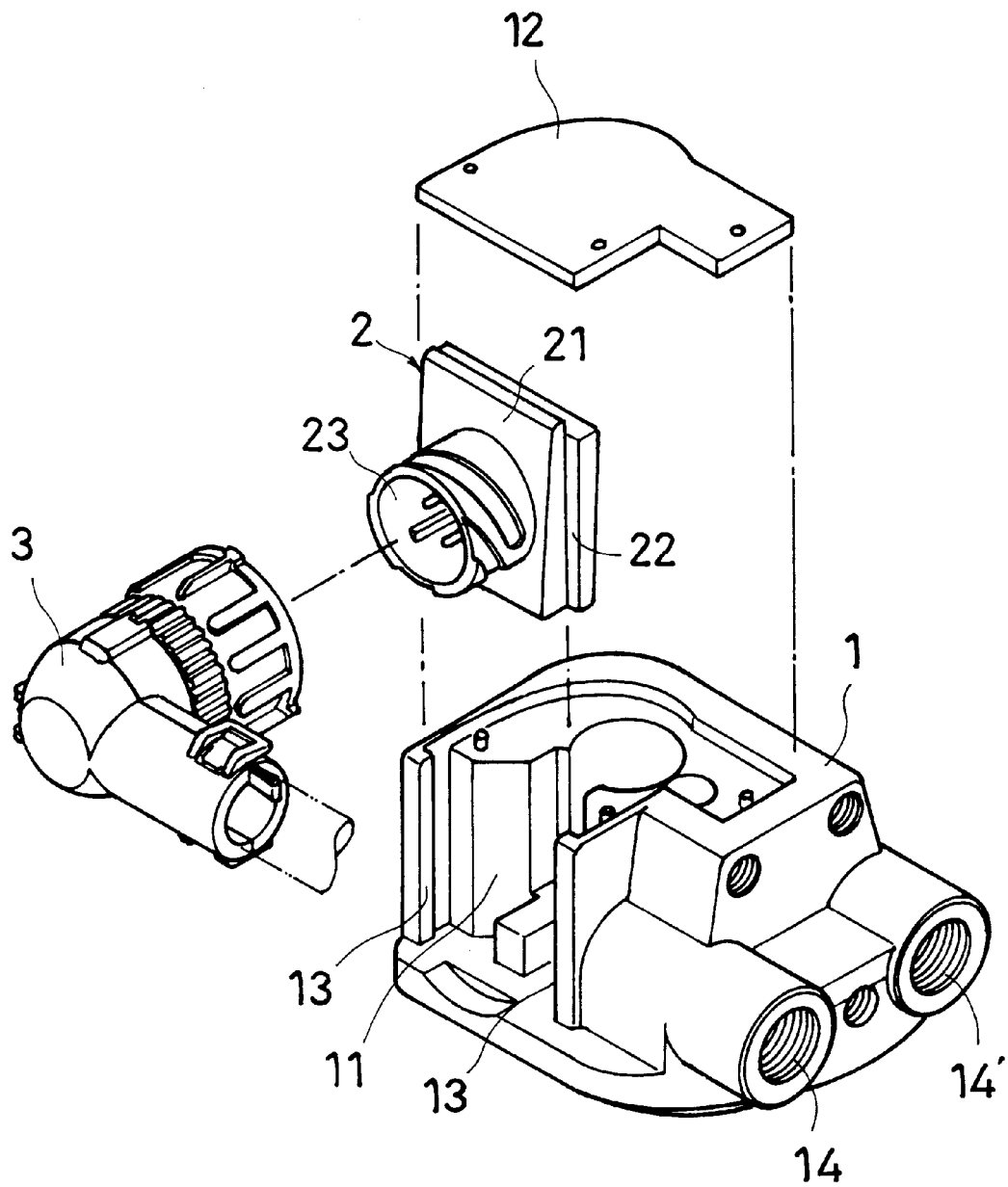
FIG. 1 is an exploded view of a part of an oil supply and return tube system according to a first embodiment of the present invention.
Figure 2:
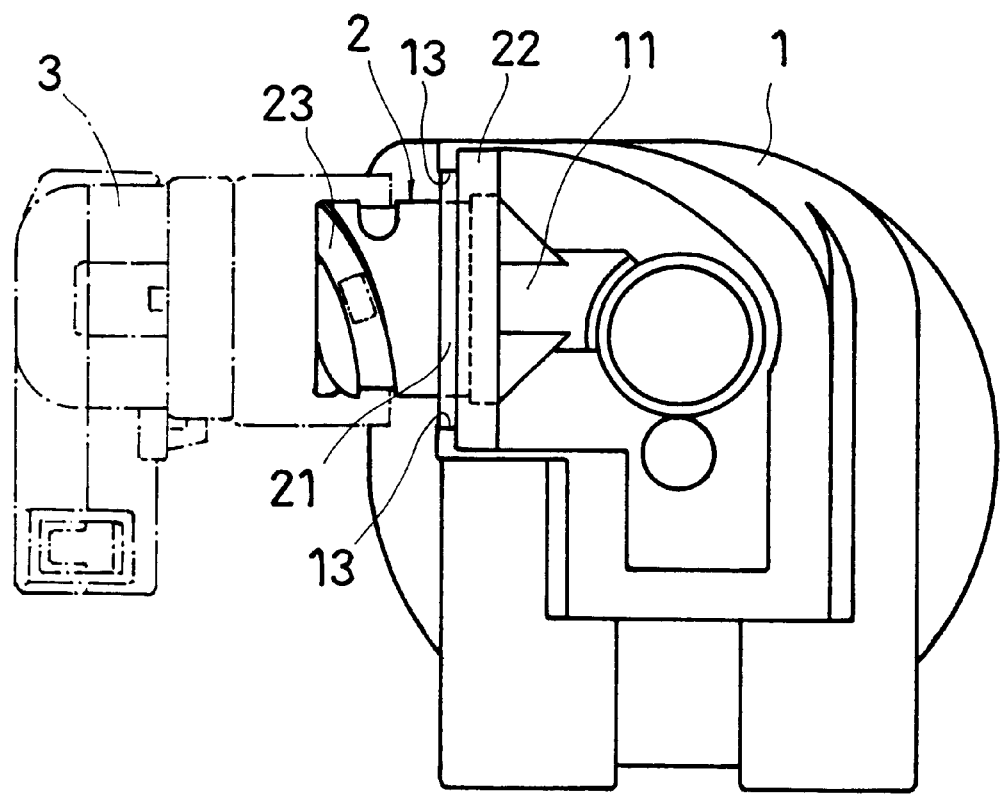
FIG. 2 is a sectional top view of the assembly of FIG. 1.
Figure 3:
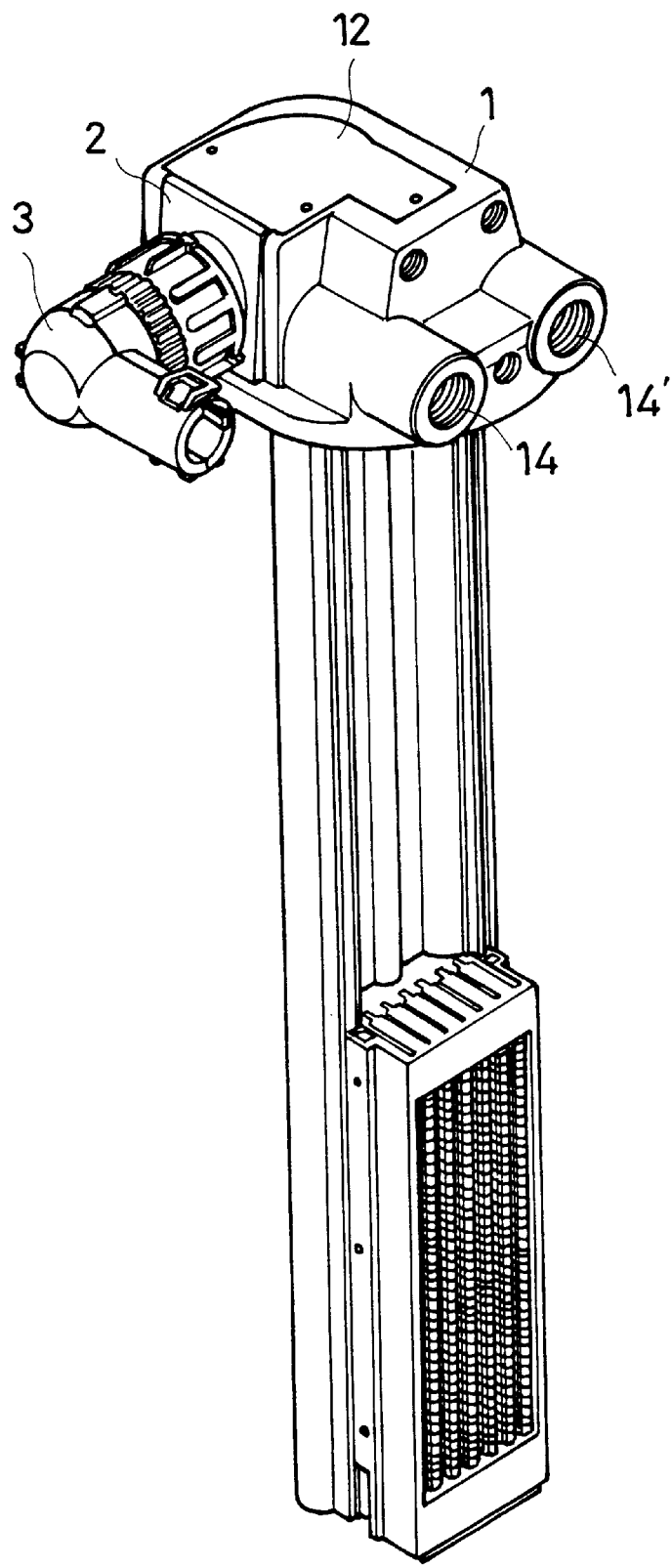
FIG. 3 shows the base connected to an oil conduit unit according to the present invention.
Figure 4:
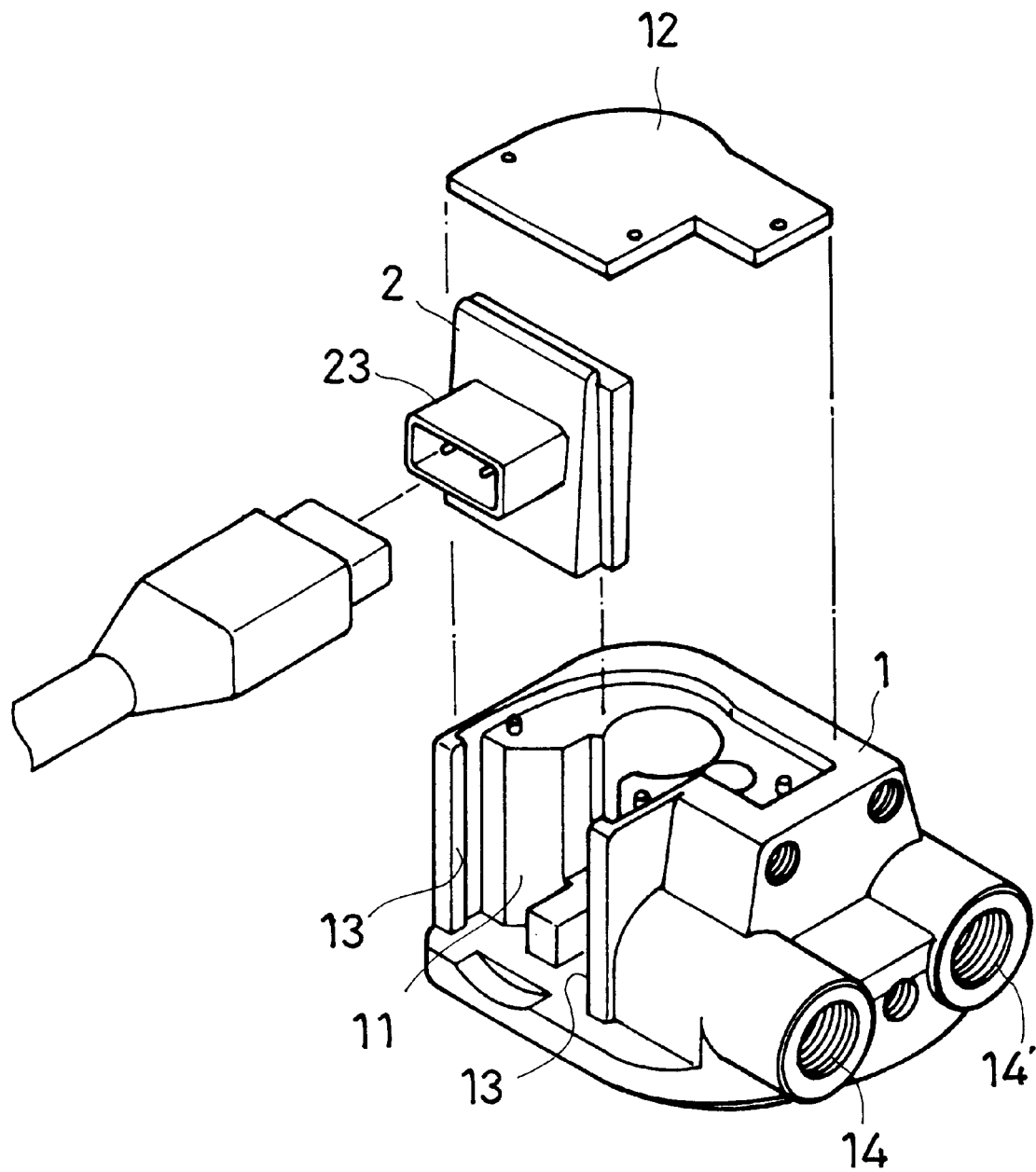
FIG. 4 is an exploded view of a part of an oil supply and return tube system according to a second embodiment of the present invention.

Referring to FIGS. 1, 2 and 3, the base 1 comprises an open chamber 11 at its top side, two vertical coupling flanges 13 bilaterally disposed at a side entrance of the open chamber 11, and a cover plate 12 covered on a top side of the open chamber 11. Before covering the cover plate 12 on the top side of the open chamber 11, a socket assembly 2 is mounted in the open chamber 11 at one side and adapted for receiving an electric plug member 3. The socket assembly 2 comprises a flat mounting plate 21 having two coupling grooves 22 respectively forced into engagement with the vertical coupling flanges 13 of the base 1, and an electric socket 23 raised from the flat mounting plate 21 at an outer side. The electric plug member 3 is adapted to connect the electric socket 23 of the socket assembly 2 to the electric circuit of the oil meter of the car in which the oil supply and return tube system is installed. The electric socket 23 of the socket assembly 2 may be variously embodied to match with different kinds of electric plug members. FIG. 4 shows an alternate form of the electric socket 23 adapted to match with a different structure of electric plug member.

Figure 5:
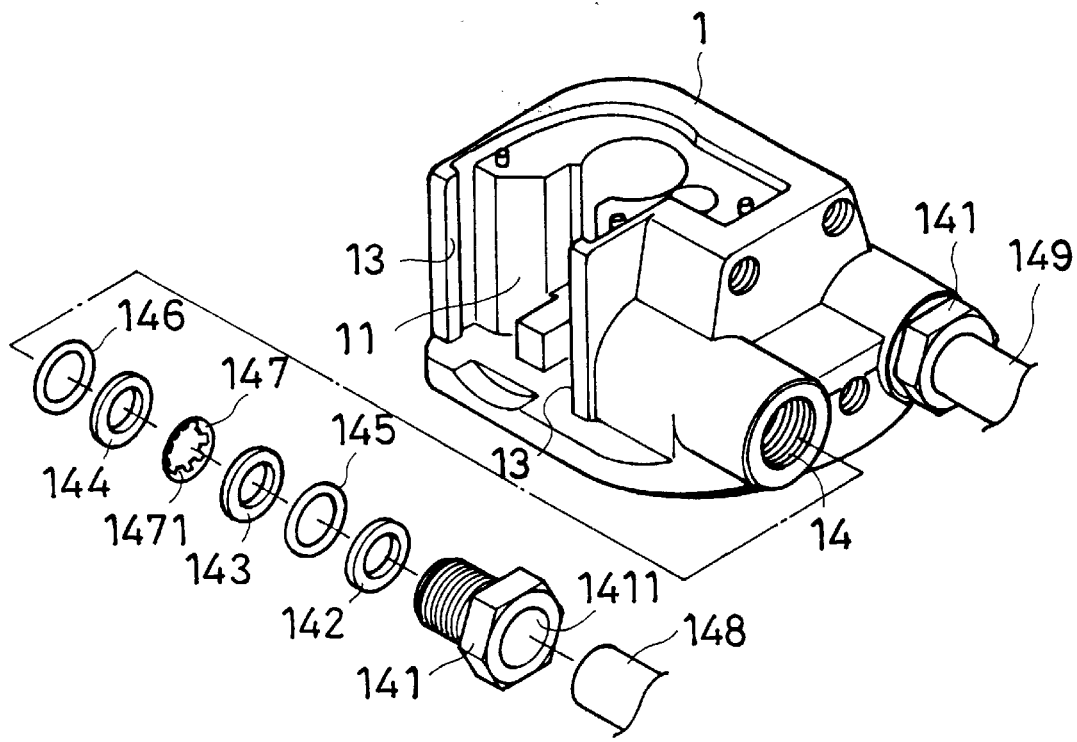
FIG. 5 is an exploded view of one oil tube mounting structure of the oil supply and return tube system according to the present invention.
Figure 6:
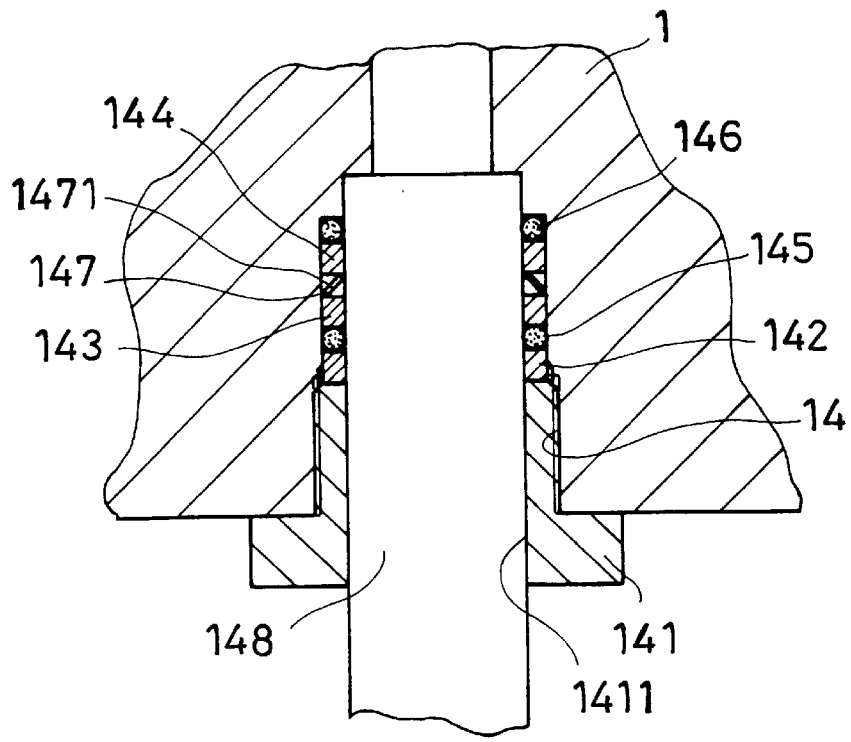
FIG. 6 is a sectional assembly view of FIG. 5.
Figure 9:
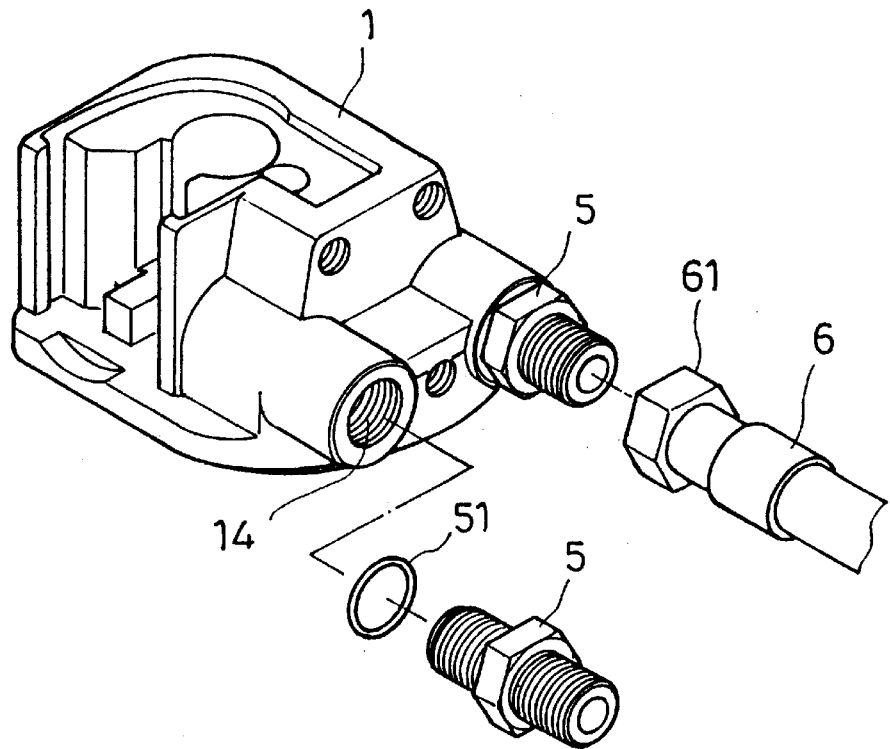
FIG. 9 is an exploded view of a part of an oil supply and return tube system according to the prior art.

Referring to FIGS. 1, 5 and 6, a lock screw tube 141 is threaded into an internally threaded oil hole 14; 14' of the base 1 to hold a plurality of cushions 142;143;144, two gaskets 145;146 and a clamping ring 147 between two cushions 143;144. The oil hole 14 is an oil return hole and the oil hole 14' is an oil intake hole. The clamping ring 147 has a plurality of oblique clamping pawls 1471. When an oil tube, such as oil return pipe 148 for oil intake pipe 149, is inserted into the respective oil hole 14; 14' through an opening 1411 in lock screw tube 141, the lock screw tube 141 is screwed tight to hold the cushions 142;143;144, the gaskets 145;146 and the clamping ring 147 firmly together, thereby causing the clamping pawls 1471 of the clamping ring 147 to be forced into engagement with the periphery of the oil tube 148;149. When the oil tube 148;149 is installed, the gap around the oil tube 148;149 within the oil hole 14;14' is sealed by the gaskets 145;146.

Figure 7:
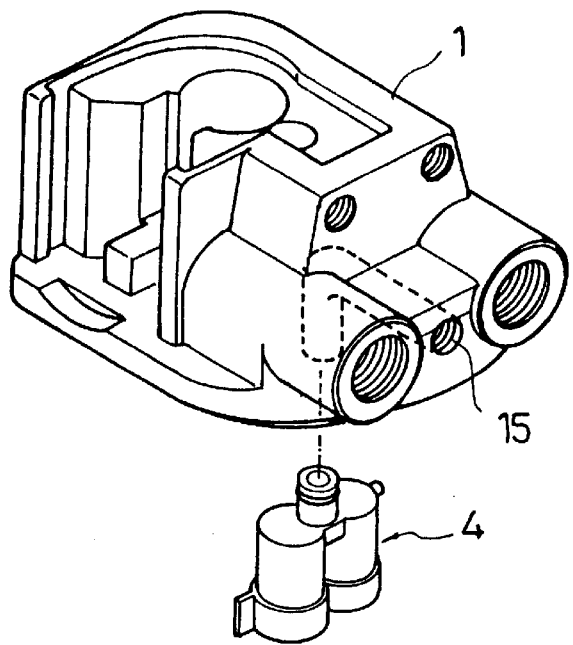
FIG. 7 shows the air discharge valve disconnected from the base according to the present invention.
Figure 8:
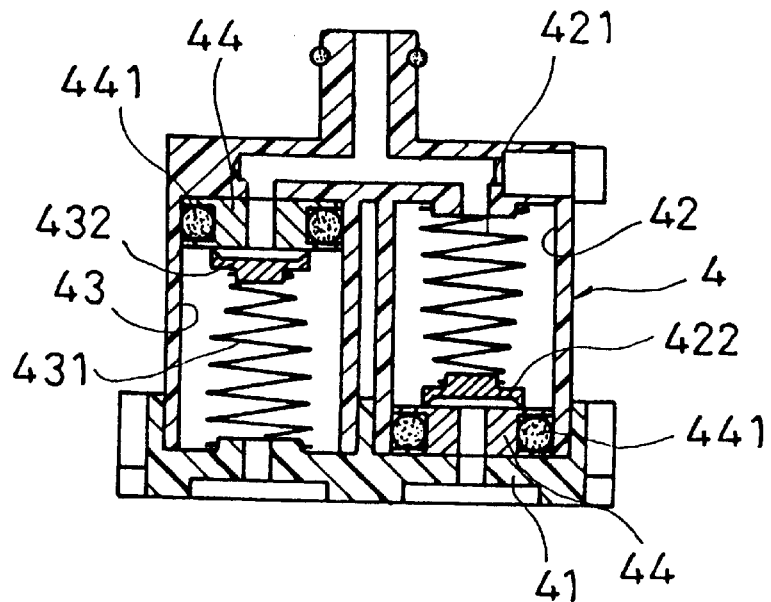
FIG. 8 is a sectional view of the air discharge valve shown in FIG. 7.
Figure 10:
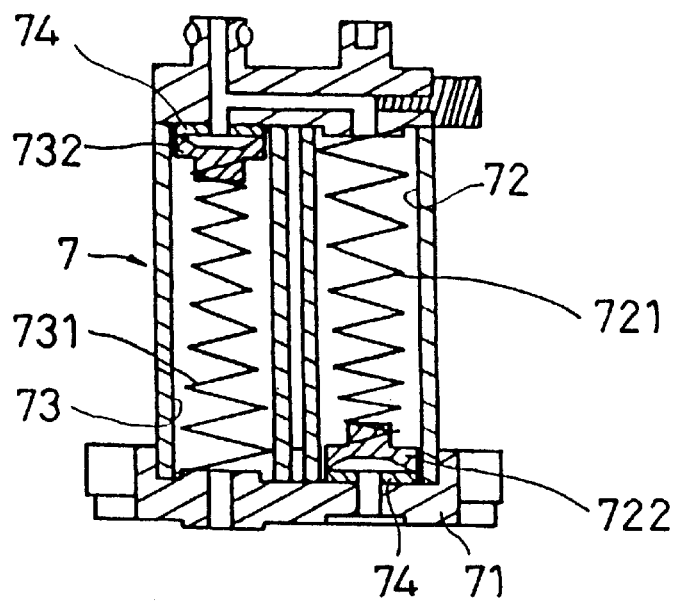
FIG. 10 is a sectional view of an air discharge valve according to the prior art.

Referring to FIGS. 7 and 8, an air discharge valve 4 is connected to an air passage hole 15 of the base 1 for adjustment of air pressure in the oil tank of the car. The air discharge valve 4 comprises an air inlet hole 42 and an air outlet hole 43 connected in parallel to the air passage hole 15 of the base 1, a cap 41 covered on the holes 42;43, a first spring 421 mounted inside the air inlet hole 42, a first stopper 422 supported on the first spring 421 and forced by it to close the passage of the air inlet hole 42, a second spring 431 mounted inside the air outlet hole 43, a second stopper 432 supported on the second spring 431 and forced by it to close the passage of the air outlet hole 43. The stoppers 422;432 are mounted with a respective copper block 44 and a respective gasket 441 around an outside annular groove (not shown) of the respective copper block 44.

It is to be understood that the drawings are designed for purposes of illustration only, and are not intended as a definition of the limits and scope of the invention disclosed.

What the invention claimed is:

1. An oil supply and return tube system connected to an oil tank of a motor vehicle, comprising a base having an internally threaded oil intake hole and an internally threaded oil return hole, an oil intake pipe connected to said oil intake hole, an oil return pipe connected to said oil return hole, an air passage hole, an air discharge valve, and two lock devices respectively fastened to said oil intake hole and said oil return hole to lock said oil intake pipe and said oil return pipe, said air discharge valve comprising an air inlet hole and an air outlet hole connected in parallel to an air passage hole of said base, a cap covered over said air inlet hole and said air outlet hole, a first spring mounted inside said air inlet hole, a first stopper supported on said first spring and mounted with a copper plate and forced by said first spring to close the passage of said air inlet hole, a second spring mounted inside said air outlet hole, a second stopper supported on said second spring and mounted with a copper plate and forced by said second spring to close the passage of said air outlet hole, wherein said base comprises an open chamber at a top side thereof, two vertical coupling flanges bilaterally disposed at a side entrance of said open chamber, a cover plate covered on a top side of said open chamber, and a socket assembly mounted in said open chamber at one side and adapted for receiving an electric plug member, said socket assembly comprising a flat mounting plate having two coupling grooves respectively forced into engagement with said vertical coupling flanges, and an electric socket raised from said flat mounting plate at an outer side and projecting out of the side entrance of said open chamber; said lock devices comprise a respective set of ring cushions and gaskets respectively mounted within said oil intake hole and said oil return hole, a respective clamping ring respectively mounted within said oil intake hole and said oil return hole and retained between two of the respective set of ring cushions, said clamping ring having a plurality of oblique clamping pawls, and a respective lock screw tube respectively threaded into said oil intake hole and said oil return hole to impart a pressure to the respective clamping ring, causing the clamping pawls of the respective clamping ring to be forced into engagement with the periphery of said oil intake pipe or oil return pipe.

2. The oil supply and return tube system of claim 1, wherein the copper plates of said first and second stoppers have a respective annular groove around the periphery and a respective gasket mounted on the respective annular groove.

\* \* \* \* \*